US012283243B2

(12) United States Patent
Chen et al.

(10) Patent No.: US 12,283,243 B2
(45) Date of Patent: Apr. 22, 2025

(54) DISPLAY PANEL AND METHOD FOR DRIVING DISPLAY PANEL, AND DISPLAY APPARATUS

(71) Applicants: Mianyang BOE Optoelectronics Technology Co., Ltd., Sichuan (CN); BOE Technology Group Co., Ltd., Beijing (CN)

(72) Inventors: Chienyu Chen, Beijing (CN); Tsanghong Wang, Beijing (CN); Xu Gong, Beijing (CN); Erlong Song, Beijing (CN); Chunyang Li, Beijing (CN)

(73) Assignees: MIANYANG BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/570,649

(22) PCT Filed: Mar. 7, 2022

(86) PCT No.: PCT/CN2022/079579
§ 371 (c)(1),
(2) Date: Dec. 15, 2023

(87) PCT Pub. No.: WO2022/267548
PCT Pub. Date: Dec. 29, 2022

(65) Prior Publication Data
US 2024/0221666 A1 Jul. 4, 2024

(30) Foreign Application Priority Data
Jun. 22, 2021 (CN) ......................... 202110690038.6

(51) Int. Cl.
*G09G 3/3233* (2016.01)
*G09G 3/20* (2006.01)

(52) U.S. Cl.
CPC ......... *G09G 3/3233* (2013.01); *G09G 3/2014* (2013.01); *G09G 2310/061* (2013.01); *G09G 2320/064* (2013.01)

(58) Field of Classification Search
CPC ...... G09G 3/2018; G09G 3/32; G09G 3/3233; G09G 3/2014; G09G 2310/061; G09G 2320/064
See application file for complete search history.

(56) References Cited

U.S. PATENT DOCUMENTS 10,902,779 B2 1/2021 Li et al.
11,189,227 B1 11/2021 Zhang et al.
(Continued)

FOREIGN PATENT DOCUMENTS

CN 106356026 A 1/2017
CN 108269517 A 7/2018
(Continued)

OTHER PUBLICATIONS

International Search Report and Written Opinion mailed on May 17, 2022, in corresponding PCT/CN2022/079579, 10 pages.
(Continued)

*Primary Examiner* — Vinh T Law
(74) *Attorney, Agent, or Firm* — XSENSUS LLP

(57) ABSTRACT

A display panel, a method for driving the display panel and a display apparatus are provided. The display panel includes a light-emitting element and a pixel circuit, the pixel circuit includes: an enable signal terminal being a pulse width modulation signal, including a plurality of first active levels spaced in one frame light-emitting duration, a first inactive level being between two adjacent first active levels, where
(Continued)

the enable signal is capable of driving the light-emitting element to emit light during a first active level period; a reset signal terminal including at least one second active level and one second inactive level in one frame light-emitting duration, the second active level being in a first inactive level period, and the first active level being in a second inactive level period, where the reset signal is capable of resetting the light-emitting device during a second active level period.

20 Claims, 4 Drawing Sheets

(56) References Cited

U.S. PATENT DOCUMENTS

| | | | | |
|---|---|---|---|---|
| 2007/0222721 | A1 | 9/2007 | Yagi | |
| 2020/0074928 | A1 | 3/2020 | Li et al. | |
| 2021/0125562 | A1 | 4/2021 | Li et al. | |
| 2021/0150985 | A1 | 5/2021 | Li et al. | |
| 2021/0375198 | A1 | 12/2021 | Zhang et al. | |
| 2022/0208078 | A1* | 6/2022 | Choi | G09G 3/2025 |
| 2022/0310007 | A1* | 9/2022 | Zhou | G09G 3/3233 |
| 2022/0335894 | A1* | 10/2022 | Zhou | G09G 3/3266 |
| 2022/0366841 | A1* | 11/2022 | Chen | G09G 5/10 |

FOREIGN PATENT DOCUMENTS

| | | | |
|---|---|---|---|
| CN | 108877680 | A | 11/2018 |
| CN | 111276097 | A | 6/2020 |
| CN | 111354293 | A | 6/2020 |
| CN | 111489701 | A | 8/2020 |
| CN | 111833816 | A | 10/2020 |
| CN | 111951731 | A | 11/2020 |
| CN | 111968574 | A | 11/2020 |
| CN | 112116897 | A | 12/2020 |
| CN | 113436577 | A | 9/2021 |
| CN | 111951731 | B | 12/2021 |
| JP | 2000-105568 | A | 4/2000 |

OTHER PUBLICATIONS

Office Action issued on Feb. 25, 2022, in corresponding Chinese patent Application No. 202110690038.6, 24 pages.
Office Action issued on Jul. 25, 2022, in corresponding Chinese patent Application No. 202110690038.6, 20 pages.
Decision of Rejection issued on Oct. 18, 2022, in corresponding Chinese patent Application No. 202110690038.6, 14 pages.

* cited by examiner

DISPLAY PANEL AND METHOD FOR DRIVING DISPLAY PANEL, AND DISPLAY APPARATUS

CROSS-REFERENCE TO RELATED APPLICATIONS

The present disclosure is a U.S. National Stage of International Application No. PCT/CN2022/079579, filed on Mar. 7, 2022, which claims a priority to Chinese Patent Application No. 202110690038.6, entitled "DISPLAY PANEL AND DRIVING METHOD THEREFOR, AND DISPLAY APPARATUS", filed on Jun. 22, 2021, the entire content of each is incorporated herein by reference.

TECHNICAL FIELD

The present disclosure relates to a field of display technology, and more particularly, to a display panel, a method for driving the display panel and a display apparatus.

BACKGROUND

OLED display panels are an important display device, and have been widely used in a mobile phone field, an on-board field, a display field, a TV field and a public display field and the like, and the market demand for the OLED display panels is increasing. However, the higher the resolution, the higher the risk of transverse leakage of electricity of the OLED display panel.

SUMMARY

The present disclosure aims to overcome the shortcomings of the prior art and provides a display panel, a method for driving a display panel and a display apparatus.

According to an aspect of the present disclosure, a display panel is provided and includes a light-emitting element and a pixel circuit, where the pixel circuit includes:

- an enable signal terminal, connected to the light-emitting element, and configured to output an enable signal to the light-emitting element, where the enable signal is a pulse width modulation signal, and includes a plurality of first active levels spaced in one frame light-emitting duration, a first inactive level is between two adjacent first active levels, and the enable signal is capable of driving the light-emitting element to emit light during a first active level period;
- a reset signal terminal, connected to the light-emitting element, and configured to output a reset signal to the light-emitting element, where the reset signal includes at least one second active level and one second inactive level in one frame light-emitting duration, the second active level is in a first inactive level period, and the first active level is in a second inactive level period, and the reset signal is capable of resetting the light-emitting device during a second active level period.

In an exemplary embodiment, the enable signal includes a plurality of the first inactive levels in one frame light-emitting duration, the reset signal includes at least one second active level in one frame light-emitting duration, and one second active level is in one first inactive level period, and the reset signal is capable of resetting the light-emitting device during the second active level period.

In an exemplary embodiment, the reset signal includes a plurality of second active levels in one frame light-emitting duration, a number of the second active levels is equal to a number of the first inactive levels, and each second active level is in each first inactive level period in a one-to-one correspondence, and the reset signal is capable of resetting the light-emitting device during each second active level period.

In an exemplary embodiment, the second active level of the reset signal includes at least one second active sub-level, each second active sub-level of each second active level is in the same first inactive level period, and the reset signal is capable of resetting the light-emitting device during each second active sub-level period.

In an exemplary embodiment, a second active level duration T2 of the reset signal is less than or equal to a first inactive level duration T1 of the enable signal;

where when the second active level includes a plurality of second active sub-levels, and the second active level duration T2 is a total duration of each second active sub-level.

In an exemplary embodiment, the second active level duration T2 of the reset signal accounts for 0.2-99% of the first inactive level duration T1 of the enable signal.

In an exemplary embodiment, a start time of the second active level of the reset signal is at the same time as a start time of the first inactive level of a corresponding enable signal;

where when the second active level includes a plurality of second active sub-levels, and the start time of the second active level is a start time of a first one of the second active sub-levels.

In an exemplary embodiment, a voltage of the reset signal at each second active level phase is equal or unequal.

In an exemplary embodiment, the display panel further includes a first power supply terminal and a second power supply terminal connected to two ends of the light-emitting element respectively, the first power supply terminal is configured to provide a first voltage to the light-emitting element, the second power supply terminal is configured to provide a second voltage to the light-emitting element, the first voltage is greater than the second voltage, and a difference between the first voltage and the second voltage is greater than a threshold voltage of the light-emitting element;

a voltage of the reset signal is less than the second voltage.

In an exemplary embodiment, a difference between the voltage of the reset signal and the second voltage is less than or equal to 10V.

According to another aspect of the present disclosure, a method for driving a display panel is provided and includes

- a light-emitting phase: outputting an enable signal to a light-emitting element, where the enable signal is a pulse width modulation signal, includes a plurality of first active levels spaced, a first inactive level is between two adjacent first active levels, and the enable signal drives the light-emitting element to emit light during a first active level period;
- a reset phase: outputting a reset signal to the light-emitting element, where the reset signal includes at least one second active level, the second active level is in a first inactive level period, the first active level is in a second inactive level period, and the reset signal resets the light-emitting device during a second active level period.

In an exemplary embodiment, the reset signal output to the light-emitting element includes a plurality of second active levels in one frame light-emitting duration, a number of the second active levels is equal to a number of the first inactive levels, and each second active level is in each first inactive level period in a one-to-one correspondence, and the reset signal resets the light-emitting device during each second active level period.

According to yet another aspect of the present disclosure, a display apparatus is provided and includes the above display panel.

It should be understood that the preceding general description and the following detailed description are exemplary and explanatory only and are not restrictive of the present disclosure.

BRIEF DESCRIPTION OF THE DRAWINGS

The accompanying drawings here are incorporated in the specification and constitute a part of this specification, show embodiments in accordance with the present disclosure and serve to explain the principles of the present disclosure together with the specification. Obviously, the drawings in the following description are only some embodiments of the present disclosure, and for those ordinary skills in the art, other drawings may also be obtained from these drawings without creative efforts.

DETAILED DESCRIPTION

Figure 1:
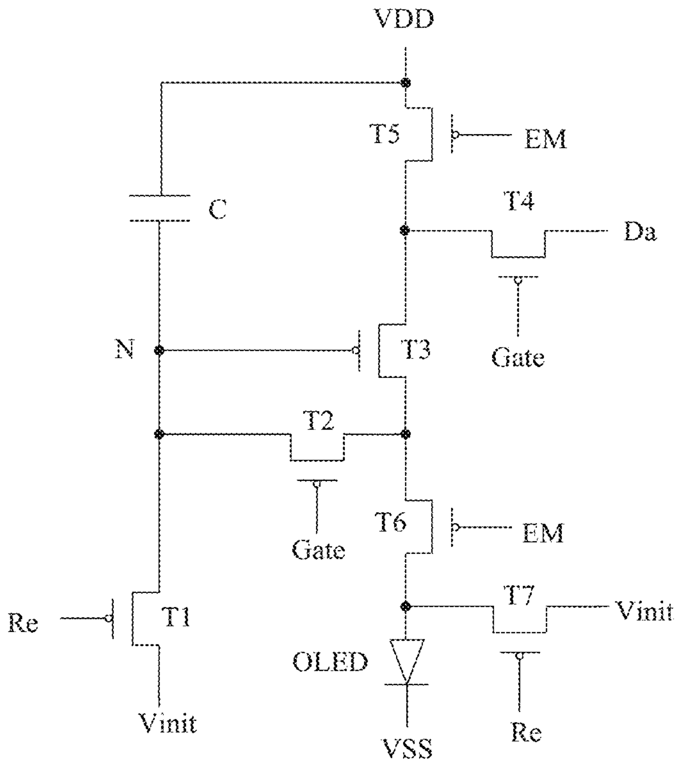
FIG. 1 is a pixel circuit diagram according to an embodiment of the present disclosure.

Example embodiments will now be described more fully with reference to the accompanying drawings. However, the embodiments may be implemented in a variety of forms and should not be construed as being limited to the examples set forth herein. Rather, these embodiments are provided such that the present disclosure will be more complete so as to convey the idea of the exemplary embodiments to those skilled in the art. The same reference numerals in the drawings denote the same or similar parts, and the repeated description thereof will be omitted. In addition, the drawings are merely schematic representations of the present disclosure and are not necessarily drawn to scale.

Although the relative terms such as “above” and “below” are used in the specification to describe the relative relationship of one component to another component shown, these terms are only for convenience in this specification, for example, according to an exemplary direction shown in the drawings. It should be understood that if the device shown is flipped upside down, the component described as “above” will become a component “below” another component. When a structure is “on” another structure, it may mean that a structure is integrally formed on another structure, or that a structure is “directly” disposed on another structure, or that a structure is “indirectly” disposed on another structure through other structures.

The terms “one,” “a,” “the,” “said”, and “at least one” are used to indicate that there are one or more elements, components, or the like. The terms “include” and “have” are used to indicate an open meaning of including and means that there may be additional elements, components, and the like, in addition to the listed elements, components, and the like. The terms “first,” “second,” and “third” and the like are used only as reference markers, and do not limit the number of objects.

Figure 2:
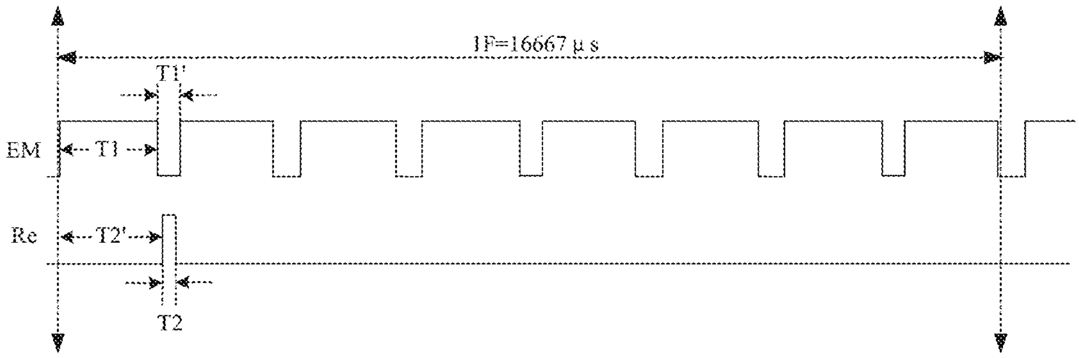
FIG. 2 shows a waveform diagram of a first type of an enable signal and a reset signal according to an embodiment of the present disclosure.

Existing OLED display panel drives a light-emitting element to emit light based on a pixel circuit, and the light-emitting element is lit up when receiving an active level of an enable signal. Since the enable signal performs scanning line by line, when a monochrome pixel (such as red) is lit, as long as a bias voltage is applied to another color (such as green) pixel, there is charge accumulation, when a large amount of charges accumulate, there may be a phenomenon of a leakage current passing through. The leakage current, although usually low, may light up another color pixel, and has a greater impact on the display of a solid color at low grayscale or low brightness than that at high grayscale/high brightness, which reduces the display effect Based on this, embodiments of the present disclosure provide a display panel, including a plurality of sub-pixels with different colors, each sub-pixel includes a light-emitting element and a pixel circuit. As shown in FIG. 1, it shows a pixel circuit of the display panel, which includes an enable signal terminal and a reset signal terminal. FIG. 2 shows a timing diagram of an enable signal and a reset signal.

The enable signal terminal is connected to the light-emitting element, and is configured to output an enable signal to the light-emitting element, the enable signal is a pulse width modulation signal, and includes a plurality of first active levels T1 that are spaced in one frame light-emitting duration, a first inactive level T1' is between two adjacent first active levels T1, and the enable signal is capable of driving the light-emitting element to emit light during a first active level T1 period. The reset signal terminal is connected to the light-emitting element, and is configured to output a reset signal to the light-emitting element, the reset signal includes at least one second active level T2 and one second inactive level T2' in one frame light-emitting duration, the second active level T2 is in a first inactive level T1' period, and the first active level T1 is in a second inactive level T2' period, and the reset signal is capable of resetting the light-emitting element during a second active level T2 period.

The enable signal of the present disclosure is a pulse width modulation signal (PWM signal), that is, a screen is constantly lit up and extinguished in one frame light-emitting duration, and the display panel adjusts the lighting-emitting brightness by adjusting a duty cycle of the PWM signal. That is, the light-emitting element emits light during the first active level T1 period of the enable signal and does not emit light during the first inactive level T1' period. The reset signal resets the light-emitting element when the light-emitting element does not emit light. Since the reset signal performs scanning line by line, when resetting each sub-pixel in the same line, on the one hand, the accumulated charges of the another sub-pixel may be released, such that charges may return to a cathode and an anode more quickly, and the risk of transverse leakage of electricity may be reduced. On the other hand, since a reset operation is performed during the first inactive level T1' period of the enable signal, the lighting of the current pixel cannot be affected.

The display panel of the embodiments of the present disclosure will be described in detail below.

As shown in FIG. 1, the present disclosure provides a circuit structure diagram of a 7T1C pixel circuit. The pixel circuit may include a first transistor T1, a second transistor T2, a driving transistor T3, a fourth transistor T4, a fifth transistor T5, a sixth transistor T6, a seventh transistor T7, and a capacitor C. A first electrode of the first transistor T1 is connected to a node N, a second electrode of the first transistor is connected to an initialization signal terminal Vinit, and a gate of the first transistor is connected to a reset signal terminal Re; a first electrode of the second transistor T2 is connected to a first electrode of the driving transistor T3, a second electrode of the second transistor T2 is connected to the node N; a gate of the second transistor T2 is connected to a gate drive signal terminal Gate; a gate of the driving transistor T3 is connected to the node N; a first electrode of the fourth transistor T4 is connected to a data signal terminal Da, a second electrode of the fourth transistor is connected to a second electrode of the driving transistor T3, and a gate of the fourth transistor is connected to the gate drive signal terminal Gate; a first electrode of the fifth transistor T5 is connected to a first power supply terminal VDD, a second electrode of the fifth transistor is connected to a second electrode of the driving transistor T3, and a gate of the fifth transistor is connected to an enable signal terminal EM; a first electrode of the sixth transistor T6 is connected to a first electrode of the driving transistor T3, and a gate of the sixth transistor is connected to the enable signal terminal EM; a gate of the seventh transistor T7 is connected to the reset signal terminal Re, a first electrode of the seventh transistor is connected to the initialization signal terminal Vinit, and a second electrode of the seventh transistor is connected to a second electrode of the sixth transistor T6. The pixel circuit may be connected to a light-emitting unit OLED to drive the light-emitting unit OLED to emit light, and the light-emitting unit OLED may be connected between the second electrode of the sixth transistor T6 and a second power supply terminal VSS. The transistors T1-T7 may all be N-type transistors.

The enable signal EM is the pulse width modulation signal, which includes a plurality of first active levels T1 and a plurality of first inactive levels T1' in one frame light-emitting phase. In the present embodiment, the first active level T1 is a high level, and the first inactive level T1' is a low level. Taking a pulse signal shown in FIG. 2 as an example, a total light-emitting duration of one frame is 16667 μs, which includes eight first active levels T1 and seven first inactive levels T1', where the first active level T1 duration is 2010.4 μs, and the first inactive level T1' duration is 72.5 μs. When the current sub-pixel needs to be lit up, a gate drive signal Gate and a data signal Da of the sub-pixel are both active levels in one frame light-emitting duration. Thus, the light-emitting element may be driven to light at each first active level T1 period in the frame light-emitting duration.

The reset signal includes at least one second active level T2 in the frame light-emitting duration. In this embodiment, the second active level T2 is a high level and the second inactive level T2' is a low level. Taking the reset signal shown in FIG. 2 as an example, in one frame light-emitting duration, the reset signal includes one second active level T2, which is in a first one of the first inactive levels T1', that is, the reset signal resets the light-emitting element when the light-emitting element is extinguished for the first time in one frame light-emitting duration. Similarly, when the second active level T2 is in any one of a second one, a third one . . . , a seventh one of the first inactive levels T1', it is capable of resetting the light-emitting element in this line, so as to avoid the leakage of electricity caused by charge accumulation of other sub-pixels. It may be understood that the reset signal may also include two or more second active levels T2, each second active level T2 is in one first inactive level T1', and the light-emitting element may be reset multiple times in a light-emitting phase t3 to reduce the charge accumulation.

In the present disclosure, the reset signal and the enable signal may be provided by a GOA circuit drive chip set around the panel.

Figure 3:
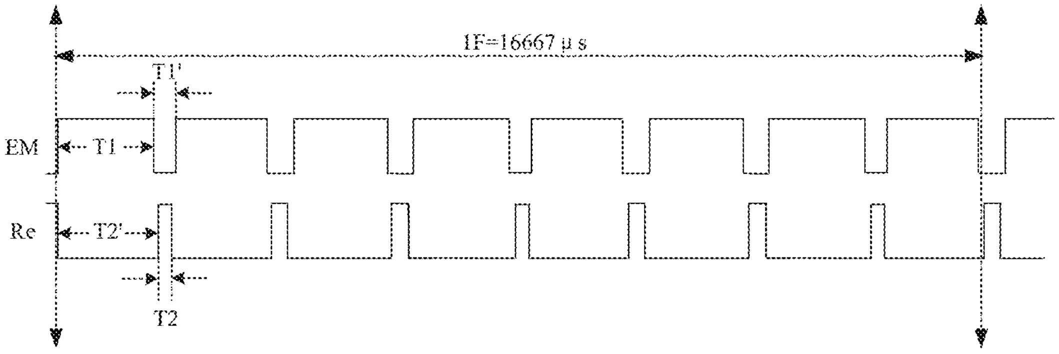
FIG. 3 shows a waveform diagram of a second type of an enable signal and a reset signal according to an embodiment of the present disclosure.

For example, in one embodiment, the reset signal includes a plurality of second active levels T2 in one frame light-emitting duration, a number of the second active levels T2 is equal to a number of the first inactive levels T1', and each second active level T2 of the reset signal is in each first inactive level T1' period of the enable signal in a one-to-one correspondence, and the reset signal is capable of resetting the light-emitting element during each first inactive level T1' period of the enable signal. Taking a signal shown in FIG. 3 as an example, in a light-emitting phase t3, the reset signal includes seven second active levels T2, and the seven second active levels T2 are in the seven first inactive levels T1' in a one-to-one correspondence, and that is, the reset signal resets the light-emitting element every time the light-emitting element is extinguished in the light-emitting phase t3, so as to avoid the leakage of electricity caused by charge accumulation of other sub-pixels to a greater extent.

When the reset signal includes a plurality of second active levels T2 in a reset phase ti, each second active level T2 duration may be the same or different.

Figure 4:
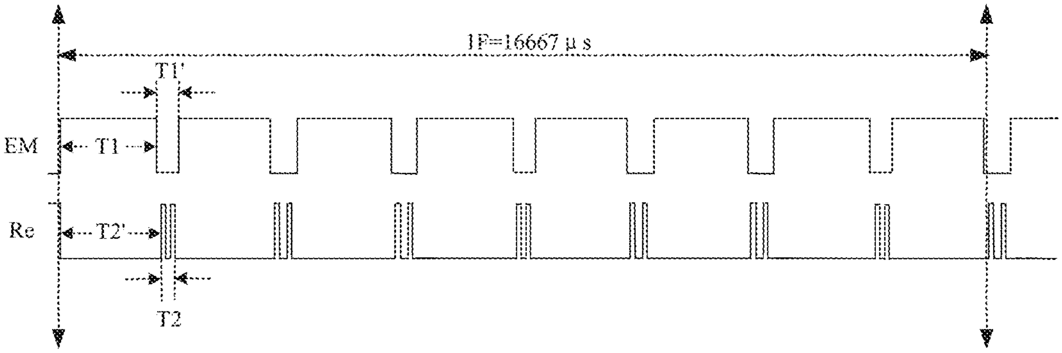
FIG. 4 shows a waveform diagram of a third type of an enable signal and a reset signal according to an embodiment of the present disclosure.

In another embodiment, the second active level T2 of the reset signal includes at least one second active sub-level, when the second active level T2 includes a plurality of second active sub-levels, each second active sub-level is in the same first inactive level T1' period. As shown in FIG. 4, each second active level T2 of the reset signal includes two spaced second active sub-levels, and the two second active sub-levels are in the same first inactive level T1' of the enable signal. The reset signal is capable of resetting the light-emitting element twice in each second active level T2 period, so as to further release the accumulated charge. It may be understood that one second active level T2 of the reset signal also includes three, four or more second active sub-levels, or merely includes one second active sub-level. When the second active level T2 includes a plurality of second active sub-levels, each second active sub-level duration may be the same or different.

In the present disclosure, the second active level T2 of the reset signal is in the first inactive level T1' duration of the enable signal, and that is, the second active level T2 duration of the reset signal is less than or equal to the first inactive level T1' duration of the enable signal, such that the light-emitting element may be reset without affecting the normal light emission of the light-emitting element. When the second active level T2 includes a plurality of second active sub-levels, the second active level T2 duration is a total duration of each second active sub-level.

Further, the second active level T2 duration of the reset signal determines the charge release of the light-emitting element, if the duration is too short, it may lead to incomplete charge release; if the duration is too long, it may affect the normal operation in the compensation phase or the light-emitting phase. Thus, a ratio of the second active level T2 duration of the reset signal to the first inactive level T1' duration of the enable signal is preferably within a range of 0.2-99%. For example, taking the example shown in the drawing, the first inactive level T1' duration of the enable signal is 72.5 μs, the second active level duration T2 of the reset signal is 5.2 μs, and a ratio of the second active level T2 duration to the first inactive level T1' duration of the enable signal is 7.17%.

Figure 5:
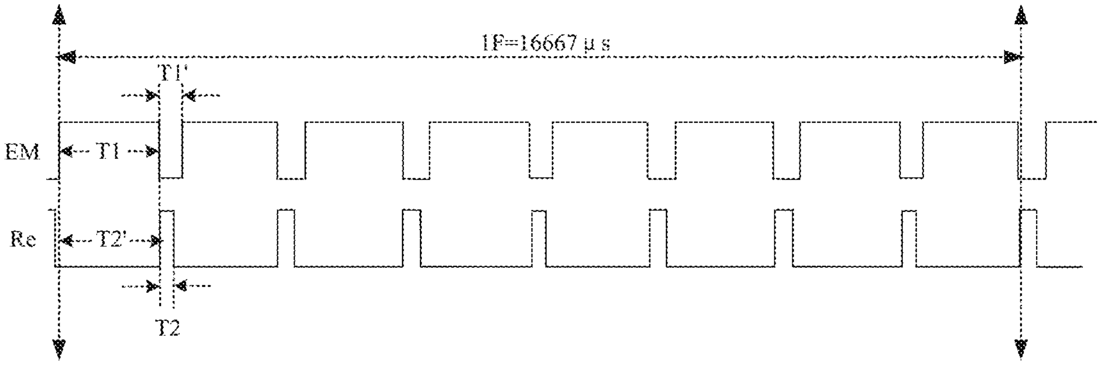
FIG. 5 shows a waveform diagram of a fourth type of an enable signal and a reset signal according to an embodiment of the present disclosure.

In the present disclosure, a start time of the second active level T2 of the reset signal is at the same time as a start time of the first active level T1' of a corresponding enable signal. As shown in FIG. 5, the second active level T2 of the reset signal is a high level, and the first inactive level T1' of the enable signal is a low level, a rising edge of the reset signal is at the same time as a falling edge of the enable signal. That is, the light-emitting element performs a reset just after the first active level T1 of the enable signal ends, thereby eliminating the accumulated charges of other sub-pixels while quickly turning off light-emitting element by the reset signal.

Figure 6:
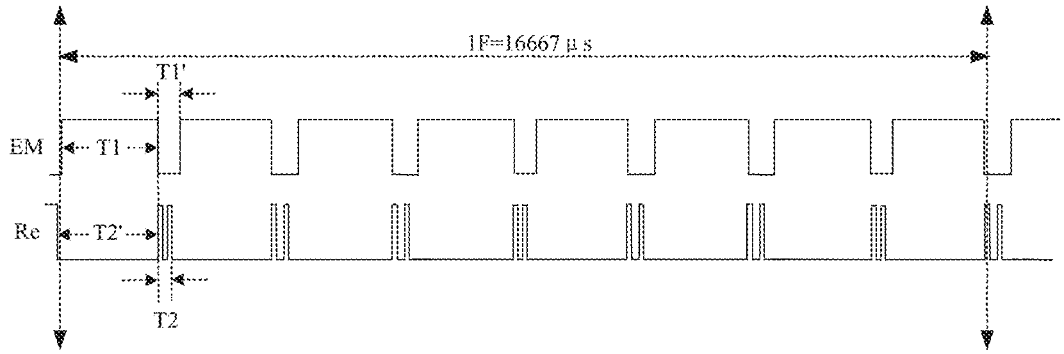
FIG. 6 shows a waveform diagram of a fifth type of an enable signal and a reset signal according to an embodiment of the present disclosure.

As shown in FIG. 6, when the second active level T2 of the reset signal includes a plurality of second active sub-levels, the start time of the second active level T2 is a start time of a first one of the second active sub-levels. That is, the light-emitting element performs a first reset just after the first active level T1 of the enable signal ends, and then performs a plurality of resets successively in the first active level T1, to achieve the release of the accumulated charges.

In the present disclosure, a voltage of a first power supply terminal VDD is a first voltage, and a voltage of a second power supply terminal VSS is a second voltage, the first voltage is greater than the second voltage, and a difference between the first voltage and the second voltage is greater than a threshold voltage of the light-emitting element, such that the light-emitting element may be driven to emit light. In order to reset it, a voltage of the reset signal is less than the second voltage, such that a reverse voltage may be applied to the light-emitting element, causing a stronger electric field to force the light-emitting element to discharge, thus reducing a chance of the leakage of electricity.

Further, in the present disclosure, a difference between the voltage of the reset signal and the second voltage is less than or equal to 10V, so as to achieve a desirable effect of releasing the charges without affecting the subsequent normal light emission.

It should be noted that the present disclosure merely shows a structure of a pixel circuit, however, the reset signal terminal and the enable signal terminal of the present disclosure may also be used in the structure of other pixel circuits, which may improve the transverse leakage of electricity of the display panel, which is not repeated in the present disclosure.

The embodiments of the present disclosure also provide a method for driving a display panel, including:

a) a light-emitting phase: outputting an enable signal to a light-emitting element, where the enable signal is a pulse width modulation signal, includes a plurality of first active levels T1 that are spaced, a first inactive level T1' is between two adjacent first active levels T1, and the enable signal drives the light-emitting element to emit light during a first active level T1 period;

b) a reset phase: outputting a reset signal to the light-emitting element, where the reset signal includes at least one second active level T2, the second active level T2 is in a first inactive level T1' period, the first active level T1 is in a second inactive level T2' period, and the reset signal resets the light-emitting element during a second active level T2 period.

In an embodiment, referring to FIG. 4, the reset signal output to the light-emitting element comprises a plurality of second active levels T2 in one frame light-emitting duration, a number of the second active levels T2 is equal to a number of the first inactive levels T1', and each second active level T2 is in each first inactive level T1' period in a one-to-one correspondence, and the reset signal resets the light-emitting element during each second active level period, which may be referred to the description of the display panel for details and is not repeated herein.

Figure 7:
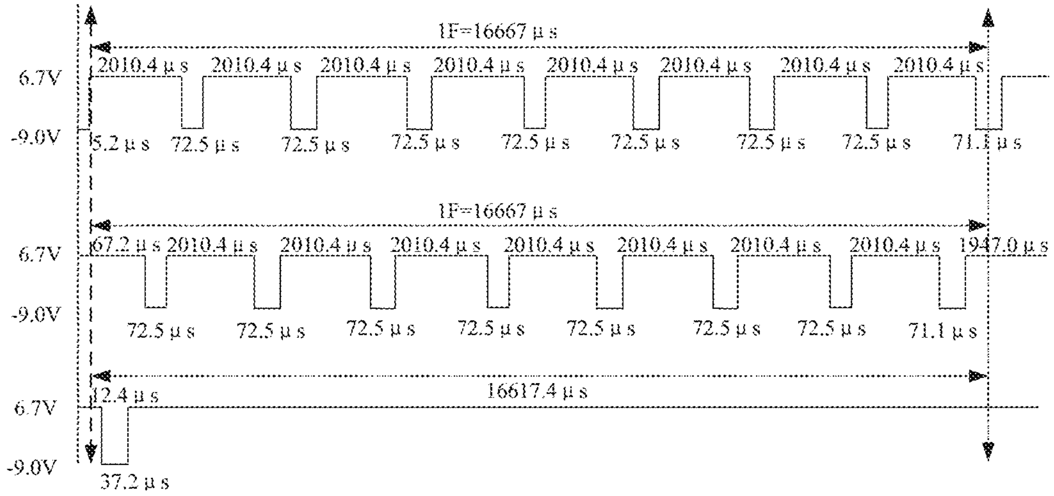
FIG. 7 shows a waveform comparison diagram of different enable signals.

Referring to FIG. 7, a comparison diagram of several different EM signal waveforms is shown, with the topmost being an EM signal waveform diagram of a pulse width modulation signal that performs the reset operation of the present disclosure, the second being an EM signal waveform diagram of a pulse width modulation signal that does not perform the reset operation of the present disclosure, and the third being a traditional EM signal waveform diagram when it is constantly lit up in the light-emitting phase. By comparing the three waveform diagrams, it may be seen that, compared to the EM signal waveform diagram of a pulse width modulation signal that does not perform the reset operation, a phase of the EM signal waveform diagram of the pulse width modulation signal EM signal that performs the reset operation is advanced, and the advanced time is the second active level T2 duration of the reset signal.

Figure 8:
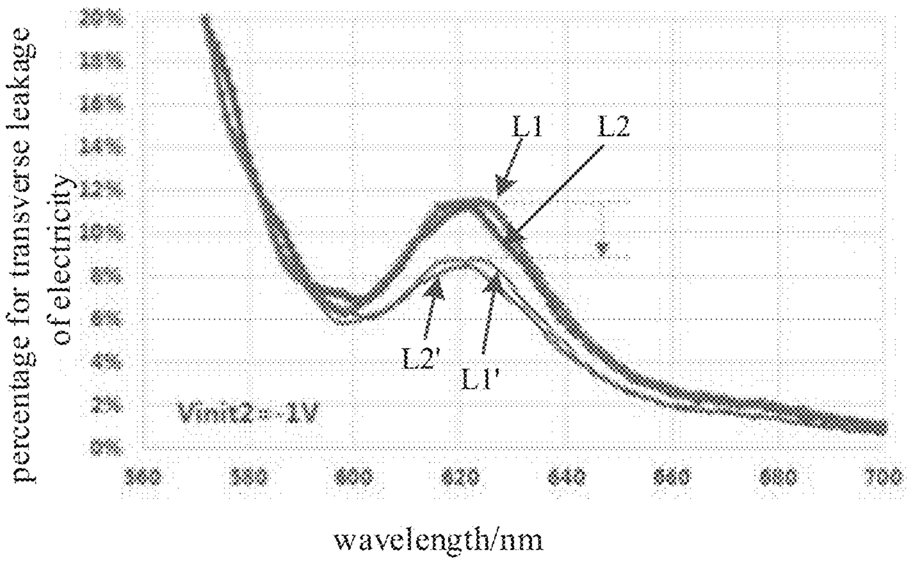
FIG. 8 shows a test curve of transverse leakage of electricity.
Figure 9:
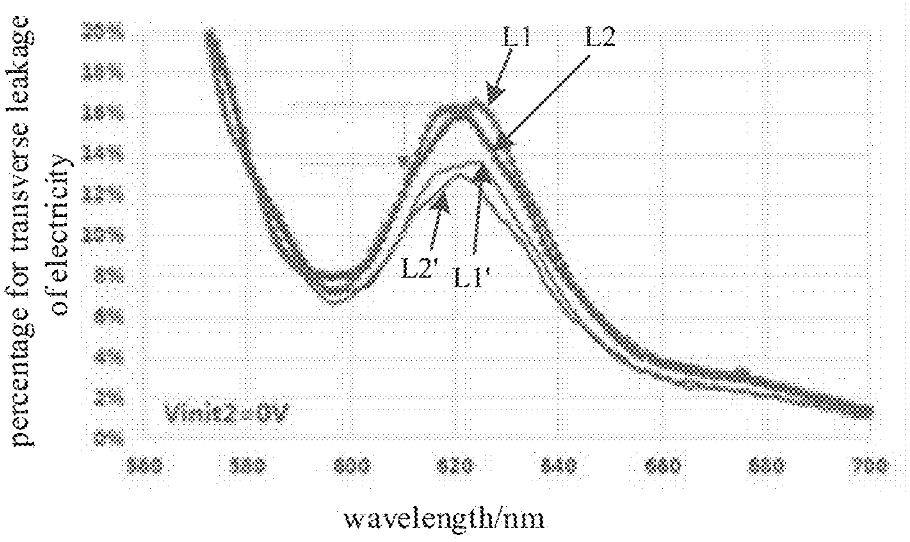
FIG. 9 shows another test curve of transverse leakage of electricity.

Referring to FIG. 8 and FIG. 9, it is shown the performance comparison of the transverse leakage of electricity of the display panel of the present disclosure, the test is to light up the green sub-pixel and test the leakage for the red sub-pixel. FIG. 8 shows leakage curves of two sample tests, where the abscissa is spectrum, and the ordinate is a percentage for the transverse leakage of electricity, a curve L1 represents a variation curve of the percentage of the transverse leakage of electricity with the spectrum when the sub-pixel is not reset according to the present disclosure in a first sample test, and a curve L1' represents a variation curve of the percentage of the transverse leakage of electricity with the spectrum when the sub-pixel is reset according to the present disclosure in a first test, a curve L2 represents a variation curve of the percentage of the transverse leakage of electricity with the spectrum when the sub-pixel is not reset according to the present disclosure in a second test, and a curve L2' represents a variation curve of the percentage of the transverse leakage of electricity with the spectrum when the sub-pixel is reset according to the present disclosure in a second test, and the voltage of the reset signal is −1V in the two tests. In addition, two sample tests are performed in the same way, with the difference that the voltages of the reset signal are 0V and the PWM duty cycles are different, and the result is shown in FIG. 9.

The results show that the leakage of electricity for the two samples is basically the same regardless of whether the reset operation of the present disclosure is performed, indicating that the reset method is stable. According to the curve in FIG. 8, when the green sub-pixel is lit up, in case that the reset operation is not performed, the percentage of the transverse leakage of electricity of the red sub-pixel is about 11.66%, and after −1V reset operation of the present disclosure is performed, the percentage of the transverse leakage of electricity of the red sub-pixel is reduced to about 9%, and the percentage of the leakage of electricity is reduced by about 2.66%. According to the curve in FIG. 9, when the green sub-pixel is lit up, in case that the reset operation is not performed, the percentage of the transverse leakage of electricity of the red sub-pixel is about 16.22%, and after 0V reset operation of the present disclosure is performed, the percentage of the transverse leakage of electricity of the red sub-pixel is reduced to about 13.3%, and the percentage of the leakage of electricity is reduced by about 2.92%. The above test results show that no matter what the reset signal voltage is and what the PWM duty cycle is, the reset operation of the present disclosure has a desirable effect on improving the transverse leakage of electricity.

The embodiments of the present disclosure also provide a display apparatus, which includes the display panel of the embodiments. Since the display apparatus includes the above display panel, it has the same beneficial effects, which is not repeated herein.

The present disclosure does not specifically limit the application of the display apparatus, which may be any product or component with a flexible display function, such as a TV, a notebook computer, a tablet computer, a wearable display device, a mobile phone, an on-board display, navigation, an e-book, a digital photo frame, an advertising light box, and the like.

A person skilled in the art may easily conceive of other embodiments of the present disclosure upon consideration of the specification and practice of the invention disclosed herein. The present disclosure is intended to cover any variations, uses, or adaptations of the present disclosure that follow the general principle of the present disclosure and include common general knowledge or techniques in the technical field not disclosed by the present disclosure. The specification and examples are to be regarded as exemplary only, with the true scope and spirit of the present disclosure being indicated by the appended claims.

What is claimed is:

1. A display panel, comprising a light-emitting element and a pixel circuit, wherein the pixel circuit comprises:

an enable signal terminal, connected to the light-emitting element, and configured to output an enable signal to the light-emitting element, wherein the enable signal is a pulse width modulation signal, and comprises a plurality of first active levels spaced in one frame light-emitting duration, a first inactive level is between two adjacent first active levels, and the enable signal is capable of driving the light-emitting element to emit light during a first active level period;

a reset signal terminal, connected to the light-emitting element, and configured to output a reset signal to the light-emitting element, wherein the reset signal comprises at least one second active level and one second inactive level in one frame light-emitting duration, the second active level is in a first inactive level period, and the first active level is in a second inactive level period, and the reset signal is capable of resetting the light-emitting element during a second active level period.

2. The display panel according to claim 1, wherein the enable signal comprises a plurality of the first inactive levels in one frame light-emitting duration, the reset signal comprises at least one second active level in one frame light-emitting duration, and one second active level is in one first inactive level period, and the reset signal is capable of resetting the light-emitting element during the second active level period.

3. The display panel according to claim 2, wherein the reset signal comprises a plurality of second active levels in one frame light-emitting duration, a number of the second active levels is equal to a number of the first inactive levels, and each second active level is in each first inactive level period in a one-to-one correspondence, and the reset signal is capable of resetting the light-emitting element during each second active level period.

4. The display panel according to claim 3, wherein the second active level of the reset signal comprises at least one second active sub-level, each second active sub-level of each second active level is in the same first inactive level period, and the reset signal is capable of resetting the light-emitting element during each second active sub-level period.

5. The display panel according to claim 4, wherein a second active level duration of the reset signal is less than or equal to a first inactive level duration of the enable signal;

wherein when the second active level comprises a plurality of second active sub-levels, and the second active level duration is a total duration of each second active sub-level.

6. The display panel according to claim 5, wherein the second active level duration of the reset signal accounts for 0.2-99% of the first inactive level duration of the enable signal.

7. The display panel according to claim 4, wherein a start time of the second active level of the reset signal is at the same time as a start time of the first inactive level of a corresponding enable signal;

wherein when the second active level comprises a plurality of second active sub-levels, and the start time of the second active level is a start time of a first one of the second active sub-levels.

8. The display panel according to claim 1, wherein a voltage of the reset signal at each second active level phase is equal or unequal.

9. The display panel according to claim 1, wherein the display panel further comprises a first power supply terminal and a second power supply terminal connected to two ends of the light-emitting element respectively, the first power supply terminal is configured to provide a first voltage to the light-emitting element, the second power supply terminal is configured to provide a second voltage to the light-emitting element, the first voltage is greater than the second voltage, and a difference between the first voltage and the second voltage is greater than a threshold voltage of the light-emitting element;

a voltage of the reset signal is less than the second voltage.

10. The display panel according to claim 9, wherein a difference between the voltage of the reset signal and the second voltage is less than or equal to 10V.

11. A method for driving a display panel, comprising:

a light-emitting phase: outputting an enable signal to a light-emitting element, wherein the enable signal is a pulse width modulation signal, comprises a plurality of first active levels spaced, a first inactive level is between two adjacent first active levels, and the enable signal drives the light-emitting element to emit light during a first active level period;

a reset phase: outputting a reset signal to the light-emitting element, wherein the reset signal comprises at least one second active level, the second active level is in a first inactive level period, the first active level is in a second inactive level period, and the reset signal resets the light-emitting element during a second active level period.

12. The method for driving the display panel according to claim 11, wherein the reset signal output to the light-emitting element comprises a plurality of second active levels in one frame light-emitting duration, a number of the second active levels is equal to a number of the first inactive levels, and each second active level is in each first inactive level period in a one-to-one correspondence, and the reset signal resets the light-emitting element during each second active level period.

13. A display apparatus, comprising a display panel, wherein the display panel comprises a light-emitting element and a pixel circuit, wherein the pixel circuit comprises:

an enable signal terminal, connected to the light-emitting element, and configured to output an enable signal to the light-emitting element, wherein the enable signal is a pulse width modulation signal, and comprises a plurality of first active levels spaced in one frame light-emitting duration, a first inactive level is between two adjacent first active levels, and the enable signal is capable of driving the light-emitting element to emit light during a first active level period;

a reset signal terminal, connected to the light-emitting element, and configured to output a reset signal to the light-emitting element, wherein the reset signal comprises at least one second active level and one second inactive level in one frame light-emitting duration, the second active level is in a first inactive level period, and the first active level is in a second inactive level period, and the reset signal is capable of resetting the light-emitting element during a second active level period.

14. The display apparatus according to claim 13, wherein the enable signal comprises a plurality of the first inactive levels in one frame light-emitting duration, the reset signal comprises at least one second active level in one frame light-emitting duration, and one second active level is in one first inactive level period, and the reset signal is capable of resetting the light-emitting element during the second active level period.

15. The display apparatus according to claim 14, wherein the reset signal comprises a plurality of second active levels in one frame light-emitting duration, a number of the second active levels is equal to a number of the first inactive levels, and each second active level is in each first inactive level period in a one-to-one correspondence, and the reset signal is capable of resetting the light-emitting element during each second active level period.

16. The display apparatus according to claim 15, wherein the second active level of the reset signal comprises at least one second active sub-level, each second active sub-level of each second active level is in the same first inactive level period, and the reset signal is capable of resetting the light-emitting element during each second active sub-level period.

17. The display apparatus according to claim 16, wherein a second active level duration of the reset signal is less than or equal to a first inactive level duration of the enable signal;

wherein when the second active level comprises a plurality of second active sub-levels, and the second active level duration is a total duration of each second active sub-level.

18. The display apparatus according to claim 17, wherein the second active level duration of the reset signal accounts for 0.2-99% of the first inactive level duration of the enable signal.

19. The display apparatus according to claim 16, wherein a start time of the second active level of the reset signal is at the same time as a start time of the first inactive level of a corresponding enable signal;

wherein when the second active level comprises a plurality of second active sub-levels, and the start time of the second active level is a start time of a first one of the second active sub-levels.

20. The display apparatus according to claim 13, wherein a voltage of the reset signal at each second active level phase is equal or unequal.

* * * * *